United States Patent
Priaroggia et al.

[11] 3,798,345
[45] Mar. 19, 1974

[54] OIL FILLED ELECTRIC SUBMARINE CABLE WITH OIL DUCT RESTRICTORS

[75] Inventors: Paolo Gazzana Priaroggia, Milan; Antonio Ferrentino, Monza, both of Italy

[73] Assignee: Industrie Pirelli Societa Per Azioni, Milan, Italy

[22] Filed: June 18, 1973

[21] Appl. No.: 371,123

[30] Foreign Application Priority Data
July 3, 1972    Italy .........................26535 A/72

[52] U.S. Cl. ............... 174/14 R, 138/44, 174/15 C, 174/23 R, 210/315
[51] Int. Cl. ........................................... H01b 9/06
[58] Field of Search .... 174/23 R, 14 R, 11 R, 15 C; 210/23, 315; 138/40, 43, 44, 45

[56] References Cited
UNITED STATES PATENTS
3,627,677  12/1971  Dyrud ................................. 210/23
3,085,690  4/1963  May ............................. 210/315 X
3,016,345  1/1962  Price ............................. 210/23 X
2,872,043  2/1959  Fitzgerald et al. ............... 210/315 X
2,788,125  4/1957  Webb ............................. 210/23 X
2,288,532  6/1942  Knapp ............................. 210/23 X

*Primary Examiner*—Harold Broome
*Assistant Examiner*—A. T. Grimley
*Attorney, Agent, or Firm*—Brooks, Haidt & Haffner

[57]  ABSTRACT

An oil-filled, electric, submarine cable having an oil duct with a plurality of water blocking restrictors, e.g., blocks or diaphragms with holes of the size which prevent the passage of water drops but which permit the passage of oil, thereby confining, in the event of damage to the cable, water drops to the section of the cable between restrictors.

5 Claims, 1 Drawing Figure

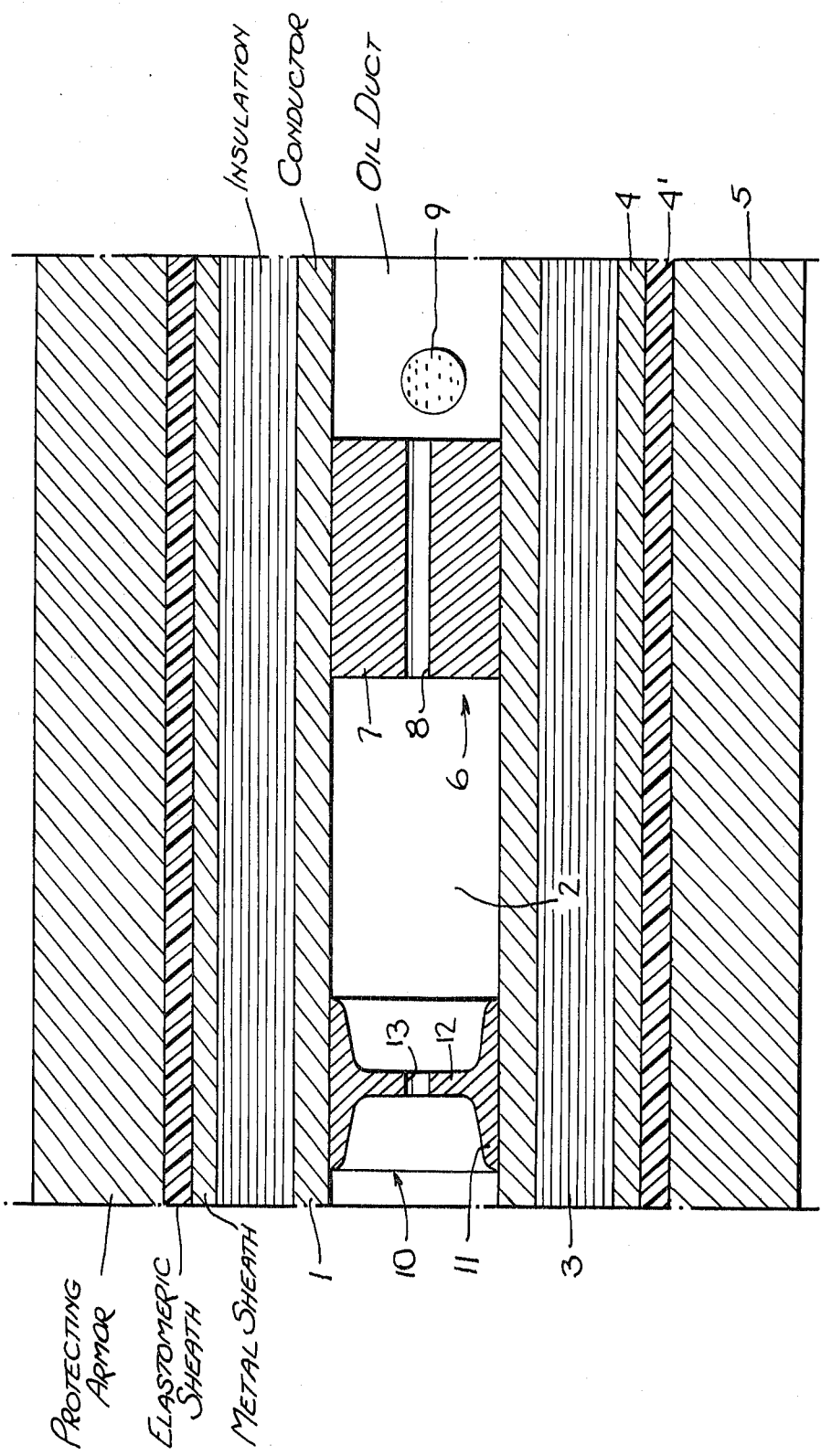

OIL FILLED ELECTRIC SUBMARINE CABLE WITH OIL DUCT RESTRICTORS

The present invention relates to electric submarine cables of the oil-filled type, and in particular, it relates to an auxiliary device intended to limit the damage caused by minor water infiltration into the oil ducts present in such cables. The auxiliary device of the invention can serve for electric cables laid on the bottom of any water course or water crossing (river, lake, etc.) and not only on the sea bottom.

It is likely that oil-filled submarine cables will suffer damage during use not the fault of those who design, manufacture, and/or install the cables. Said damage, in the form of a tear, is often due to strong impacts, with the cables, of blunt or sharp bodies, such as, for example, ships' anchors.

The cable continues to operate satisfactorily if the tear extends only to the outer covering or to the protecting sheath. However, if the tear is such that the insulating paper and the conductors are also cut, and if, at the extreme, the cable is ruptured, the fluid oil, which is constantly fed to the cable from the appropriate tanks and which circulates in the ducts present in the cable inside, flows out of the cable through the tear.

If the diameter of the oil duct in the cable is relatively large, said outflow can cause serious economical damage because of the amount of wasted oil, and moreover, it can pollute the water where the cable is laid, since a long time can pass before the cable is repaired.

On the other hand, a reduction of the diameter of the ducts can limit the oil loss, but results in other disadvantages. More specifically, since in the transitory heating or cooling periods of the cable there are oil movements along the cable because of thermal expansion and contraction, it is necessary to take into account, in designing the cable, the greater losses of pressure which result from a reduced diameter. Therefore, to obtain a sufficient minimum pressure at any point of the cable, higher pressures are to be anticipated in other cable parts, the difference between said pressures being a function of the losses of pressure. Therefore, a smaller diameter of the oil duct compels the adoption of a stronger, and consequently more expensive, structure.

For these reasons, the designer has to face two problems which require opposite, or conflicting, solutions. In other words, ducts of larger diameter would be more convenient for reducing losses of pressure, but, on the other hand, this solution would cause significant oil waste in the event of damage.

It has been proposed to limit the oil outflow by means of flow rate reduction valves, having the purpose of supplying the cable at its ends with amounts of oil less than a pre-established amount even in the event of a complete cutting of the cable itself. These expedients are actually able to reduce the oil amount which is wasted, but, owing to the different physical characteristics of water and oil, and in particular, their surface tensions, it may happen that in the damaged zone one or more water drops penetrate into the oil duct, as a consequence of the low flow rate of the outflowing oil. After pentrating, said water drops can migrate along the cable towards the portion of the cable which is at the lowest level, increasing, therefore, the extent of the damage, since a long portion of the cable must be replaced to be sure that no water drops exist in the repaired cable length.

The present invention has, as one object, the provision of a device for oil-filled cables, which is able to stop the migration of the water drops along the cable, so that large diameters of the oil duct can be used and the reduction of oil flow rate can be obtained without the disadvantages mentioned hereinbefore.

Accordingly, one object of the present invention is to provide an oil-filled, electric, submarine cable provided with one or more oil ducts, characterized in that each of said ducts contains a plurality of restricting devices, or restrictors, which may be in the form of diaphragms, and which are spaced apart along the cable and each provided with at least one opening of such dimension as to avoid the passage of water drops from one side to the other thereof.

Preferably, said opening is circular and has a diameter no greater than the diameter assumed by the water drops, in consequence of their surface tension, under actual operating conditions.

In a preferred embodiment of the invention, said restrictors are cylindrical blocks situated inside the oil duct and provided with a through hole disposed along the axis of the duct.

Alternatively, the restrictor can also be a tubular element inserted in the duct and provided with a hole in an inner transverse wall or diaphragm.

The size of the hole in each restrictor depends on many variable factors, among which are the surface tensions and the viscosities of water and of the oil used. However, said size for any given set of conditions can be easily determined by the designer skilled in the art, even, if necessary, in an experimental manner, once the characteristics of the materials employed in the cable and its operating conditions have been established.

The invention and its objects and advantages will be apparent from the following detailed description of presently preferred embodiments thereof, which description should be considered in conjunction with the accompanying drawing, the single FIGURE of which illustrates a longitudinal section of a single core, oil-filled cable having a plurality of restrictors of the invention in the oil duct thereof. Although the drawing illustrates two different embodiments of the restrictors, the restrictors in a cable may be of the same type.

In the FIGURE, the hollow conductor 1 defines an oil duct 2. Around the conductor 1 there is insulation 3 formed by paper layers which are impregnated with oil. Outside said insulation 3, there are a metal sheath 4, a sheath 4' of elastomeric or plastomeric material, and a set of protective layers 5 of a known type (frettage, armor, etc.).

Inside the duct 2 is visable a first restrictor 6 formed by a block 7 of metallic material (for example, of the same material as the conductor 1) having a diameter substantially the same as that of the duct 2. The block 7 has a hole 8 extending along the axis of the duct 2 and of a diameter which does not allow the passage of water drops, such as the water drop 9.

The water drop 9, which may, for example, have penetrated the cable through a rupture thereof, and which reaches the restrictor 6, cannot pass through the hole 8 because its surface tension would maintain it in a round form, thereby preventing it from entering the hole 8. This is ture whether or not oil movement takes place. However, the movement of the oil through the hole 8 takes place in the direction from the end of the cable towards the damaged zone to flow out of the latter, and therefore, the oil movement is such as to oppose to the advancement of the drop through said hole 8.

As stated hereinbefore, the determination of the size of the hole 8 is within the knowledge of the technician skilled in this field after having established the characteristics of the cable. However, by way of example only, if the cable has an oil duct diameter of about 30 mm., is intended to operate at a pressure of about 15 kg/cm$^2$, and is provided with a flow rate reduction valve to provide, in the event of failure, an oil flow of from 100 liters/min. to a few liters/min., the restrictors 6 can be disposed at regular intervals variable from about 200 meters to 2,000 meters from each other, and can be formed by blocks 7 having a length of from 5 to 100 millimeters and a central hole 8 with a diameter variable from 4 to 12 millimeters.

Alternatively, the restrictor can have the shape of the restrictor designated by the reference numeral 10 in the FIGURE, namely, it can be formed by a tubular element 11 also having a diameter substantially equal to the diameter of the duct 2 and provided with an inner transverse wall or diaphragm 12 having one or more holes 13 extending axially of the duct 2. The operation and the sizing and spacing criteria of this alternative embodiment are substantially the same as those indicated hereinbefore for the first embodiment.

By the adoption of restrictors 6 or 10 according to the present invention, it has been found to be possible to increase considerably the size of the oil duct 2, resulting, however, in only a small oil loss in the event of failure, and setting the reduction valves to a relatively low flow rate. In fact, possible water infiltration caused by said low flow rate is prevented by the restrictors nearest to the damaged zone, thereby enabling the repair of only a reduced length of cable. On the other hand, the adoption of a duct 2 of larger diameter reduces the losses of pressure and consequently, for the reasons explained hereinbefore, the cable can be designed for lower stresses in the transitory periods since the presence of the restrictors does not affect substantially the total pressure losses, because the restrictors, e.g., 6 and/or 10, are spaced apart along the cable and produce only localized losses of pressure.

It will be apparent to those skilled in the art that various modifications may be made without departing from the principles of the invention exemplified by the preferred embodiments of the invention which have been illustrated and described.

What is claimed is:

1. In an electric cable having a duct for the flow of an insulating fluid, the combination therewith of a plurality of restrictors in said duct, said restrictors being disposed in spaced relation with respect to each other longitudinally of said duct and each of said restrictors compriseses a wall extending across said duct and preventing the flow of fluid along said duct but having a hole therethrough of a size which permits the flow of said insulating fluid therethrough but prevents the flow of water drops therethrough.

2. An electric cable as set forth in claim 1, wherein said insulating fluid is an oil and wherein said hole is of a size smaller than the size of said water drops assumed thereby under the operating conditions of said cable and because of the surface tension of the water drops.

3. An electric cable as set forth in claim 2, wherein said duct is circular in cross-section and wherein each of said restrictors is a cylindrical block frictionally engaging the inner wall of said duct and said hole extends axially of said duct.

4. An electric cable as set forth in claim 2, wherein said duct is tubular and wherein each of said restrictors comprises a tubular element having said wall intermediate the ends thereof, the exterior size of said element being substantially equal to the size of the interior wall of said duct to cause the tubular element to frictionally engage said duct.

5. An electric cable as set forth in claim 2, wherein said restrictors are spaced from each other by a distance from about 200 to 2,000 meters and the size of said hole is about 4 millimeters to 12 millimeters in diameter.

* * * * *